Figure 1:
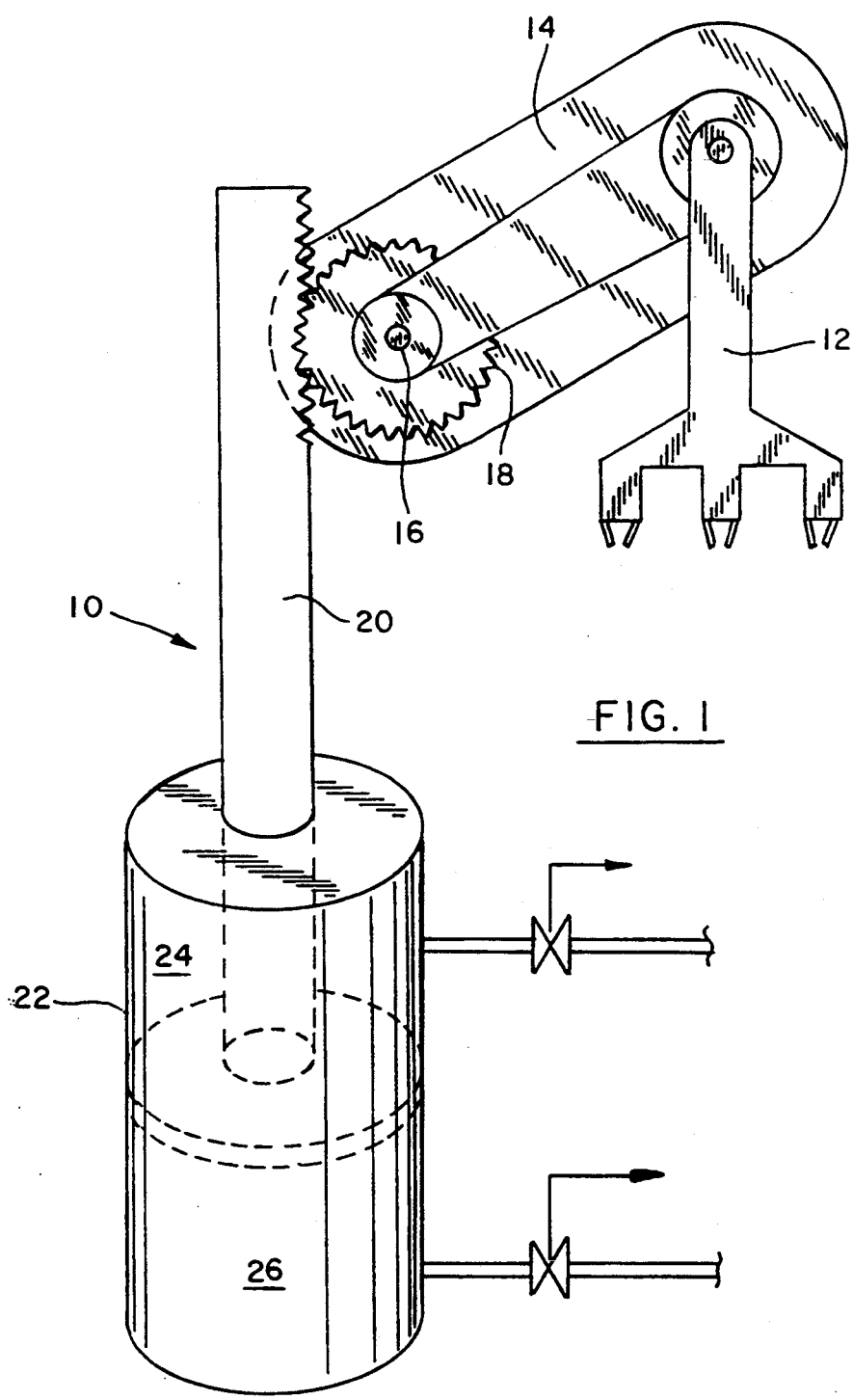

United States Patent [19]
Frederick et al.

[11] Patent Number: 5,425,794
[45] Date of Patent: Jun. 20, 1995

[54] PNEUMATIC POSITION CONTROLLER FOR I.S. MACHINE MECHANISM

[75] Inventors: Dean K. Frederick, Gallston Lake, N.Y.; Joseph L. Lehman, Canton; James R. Pettingell, Glastonbury, both of Conn.

[73] Assignee: Emhart Glass Machinery Investments Inc., Wilmington, Del.

[21] Appl. No.: 923,815

[22] Filed: Jul. 31, 1992

[51] Int. Cl.⁶ .................... C03B 35/04; C03B 9/44
[52] U.S. Cl. ........................ 65/160; 65/260; 65/163; 65/239; 65/241; 65/DIG. 13
[58] Field of Search ............... 65/260, 160, 163, 237, 65/239, DIG. 13, 241

[56] References Cited

U.S. PATENT DOCUMENTS

| | | | |
|---|---|---|---|
| 4,255,179 | 3/1981 | Foster | 65/260 |
| 4,367,087 | 1/1983 | Cardenas Franco et al. | 65/DIG. 13 |
| 4,427,431 | 1/1984 | Mumford et al. | 65/DIG. 13 |
| 4,494,973 | 1/1985 | Perry | 65/260 |
| 4,529,429 | 7/1985 | Wood | 65/DIG. 13 |
| 4,623,375 | 11/1986 | Cardenas-Franco et al. | 65/DIG. 13 |
| 4,705,552 | 11/1987 | Liska et al. | 65/160 |
| 4,783,746 | 11/1988 | Cardenas-Franco | 65/160 |

Primary Examiner—W. Gary Jones
Assistant Examiner—Steven P. Griffin
Attorney, Agent, or Firm—Spencer T. Smith

[57] ABSTRACT

A machine for forming glass containers from discrete gobs of molten glass comprising a mechanism displaceable between retracted and advanced position. A pneumatic actuator having upper and lower chambers controlled by a servo pneumatic valve controller, controls the displacement of the pneumatic actuator. A position lead based upon the actual position of the mechanism is calculated and differenced with a position demand to define a position delta. A position lag is calculated based on the position delta. The pressures within the upper and lower chambers are sensed and based thereon a force representative of the force being applied to the piston is calculated and differenced with the position lag to define a force error and a lag force is calculated based on the force error. The servo pneumatic valve controller is driven with the lag force.

2 Claims, 2 Drawing Sheets

PNEUMATIC POSITION CONTROLLER FOR I.S. MACHINE MECHANISM

The present invention relates to individual section (I.S.) glass container forming machines and more particularly to mechanisms in these machines which are displaced by pneumatic cylinders.

In state of the art I.S. machines a plurality of identical sections receive molten gobs of glass and form them into finished containers. This is a two stage process. In the first stage the gobs are formed into parisons in blank molds and in the second stage the parisons are blown into finished bottles in finish molds. An invert mechanism transfers the parisons from the blank molds to the finish molds and a takeout mechanism transfers the finished containers from the finish molds to a dead plate where they will be momentarily deposited. A pushout mechanism transfers the containers from the dead plate to a conveyor.

Displacement of these mechanism is generally carried out with a pneumatic actuator and control is achieved by monitoring position. A number of factors detract from the performance of the pneumatic actuator. Among these are: nonlinear effect caused by the travel of the piston (changing volumes of the two cylinders), nonlinearities in the motion of the mechanical parts being moved (stiction), fluctuations in the air supply pressure, the length of the tubing and constrictions and turns in the air path between the control valve and the piston, and the leakage of air.

It is accordingly an object of the present invention to eliminate or substantially reduce these undesirable effects associated with mechanical equipment which is displaced by pneumatic actuators.

Other objects and advantages of the present invention will become apparent from the following portion of the specification and from the following drawings which illustrate in accordance with the mandate of the patent statutes a presently preferred embodiment incorporating the principles of the invention.

Figure 2:
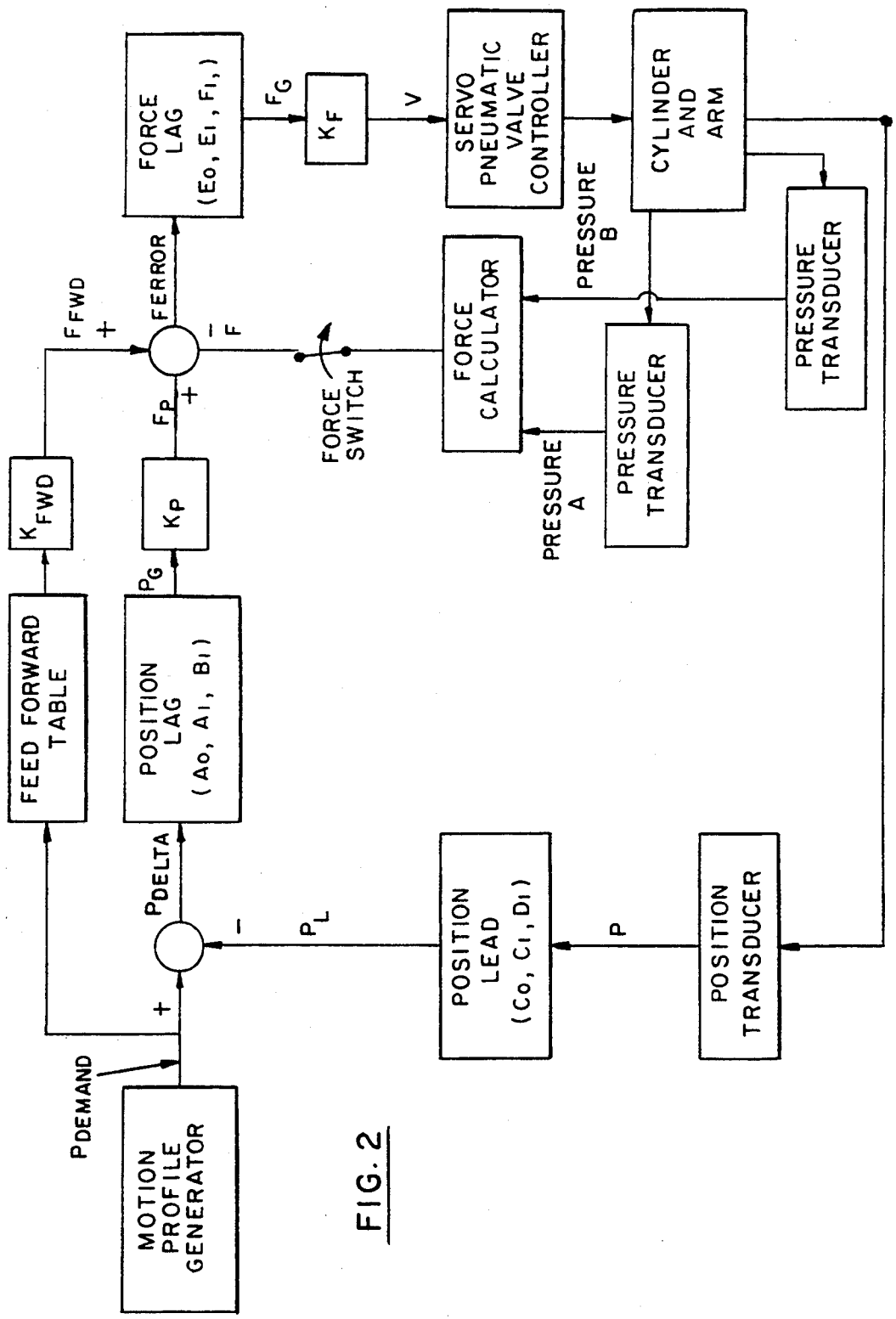

Referring to the drawings:

FIG. 1 is a schematic showing of a takeout mechanism in an I.S. machine for making glass containers and FIG. 2 is an electronic schematic for the controller for the pneumatic actuator for this takeout mechanism made in accordance with the teachings of the present invention.

A takeout mechanism 10 in an I.S. machine has a tong head 12 which is designed to grip formed bottles at the finish mold and carry them, without changing their vertical orientation, through an arc of 180° to a dead plate where they will be deposited. The tong head is suspended from an arm 14 which is mounted for pivotal displacement about a pivot shaft 16. Secured about the shaft is a pinion 18 which is driven by a linear rack 20 which is the rod of a pneumatic cylinder 22 having upper 24 and lower chambers 26. Air under pressure is introduced into the upper chamber to drive the rack in one direction and is introduced into the lower chamber to drive the rack in the other direction. Driving the rod in opposite directions achieves the desired arcuate reciprocation of the takeout arm.

The displacement or motion profile for the takeout arm will correspond to the displacement profile for the linear rack. When the rack is to move the Motion Profile Generator will output the feed profile for the rack. The demanded next position ($P_{demand}$) is differenced with the Position Lead ($P_L$) to define a positional difference ($P_{delta}$). The Position Lag determines the lag position $P_G$. The gain amplifier $K_p$ converts the lag position $P_G$ to units of force $F_p$. A force $F_{FWD}$ determined by the Feedforward Table (the force required to statically hold the existing position) which is selectively varied by a gain multiplier $K_{FWD}$, which is ideally set to one, is added to Force $F_p$. The calculated force F is subtracted from the sum of $F_p$ and $F_{FWD}$ to the form $F_{ERROR}$. Force Calculator calculates the measured force based upon the pressures sensed by suitable pressure transducers above the piston Pressure$_A$, and below the piston Pressure$_B$ (while it is preferred to measure pressure on both sides of the piston and to use the two piston areas to calculate the measured force, a single delta—P sensor can also be used to measure the pressure difference with a single area value being used to compute an approximate force value). The resulting force error $F_{error}$ is supplied to Force Lag which calculates a lag force $F_G$ which is reduced by a gain amplifier $K_F$ so that the output signal V can be directed to the infinitely variable servo pneumatic valve controller and servo pneumatic valve which will operate the cylinder. The present position P of the rack is supplied to the Position Lead by a Position Transducer.

Force Lag accordingly provides the spool-demand signal to the valve controller that is derived from:

The measured signal position P,
measurements of the pressures on both sides of the piston,
Pressure A, Pressure B,
the desired position signal $P_{demand}$, and
the Feedforward Force $F_{FWD}$.

By using the Feedforward Table, the error between the actual and the ideal profile will be decreased. Because of the non-linearity of the system, forces are different due to the relative dependent motions of three main masses (piston with rod, arm, tong-head). The Feedforward Table is used to predict the static force required for a given desired position.

$$F_{FWD} = ROD_W - \cos[PSN_V * K] * (ARM_{CG}/RADIUS_{PG} * ARM_W + TONG_{CG}/RADIUS_{PG} * TONG_W)$$

where $F_{FWD}$ = the Feedforward force component,
$ROD_W$ = weight of Rod & Piston, pounds
$PSN_V$ = measured position of the arm where zero degrees is zero volts,
K = the number of degrees per volt
$ARM_{CG}$ = Arm Center of Gravity from pinion gear axis inches,
$RADIUS_{PG}$ = radius of gear meshing with rack, inches
$ARM_W$ = Weight of Arm, pounds
$TONG_{CG}$ = Tong Head Center of Gravity from pinion gear (vertical component in relation to arm), inches
$TONG_W$ = Tong Head Weight, pounds By using the Feedforward Table, motion of a mechanism can be used to predict static force required for a given desired position.

When acceleration of the rack is being carried out, the rack will lag behind its feed profile. On the other hand when deceleration is taking place the rack tends to be further along the profile than it is supposed to be. The algorithms carried out by Position Lead, Position Lag and Force Lag are designed to achieve extremely accurate positioning.

The Coefficients defined by the software controllers are as follows:

$$PL(n) = C_0 * P(n) + C_1 * P(n-1) + D_1 PL(n-1)$$

$$PG(n) = A_0 * P_{delta}(n) + A_1 * P_{delta}(n-1) + B_1 PG(n-1)$$

$$FG(n) = E_0 * F_{error}(n) + E_1 F_{error}(n-1) + F_1 * FG(n-1)$$

where:
PL=Output of Position Lead
PG=Output of Position Lag
FG=Output of Force Lag
(n)=Current Sample
(n−1)=Previous Sample The constants in these equations must be derived empirically since they are structure dependent. The letter A has been used to identify constants associated with positional difference (A for $P_{delta}(n)$ and $A_1$ for $P_{delta}(n-1)$), and the letters B, C, D, E & F have been used to identify constants associated with lag position (PG), present position (P), position lead (PL), force error ($F_{error}$) and calculated force (F), respectively. To tune the elements of the control system the following set of tests can be used:

Test 1 Open Force Loop, Pinned Arm

Open force loop driven by square waves of different amplitude to the valve, with the rod pinned. The force and position lags are both set to unity gains, the feedforward is disabled, the software switch in the force loop is opened, and the position loop is opened (position lead set to zero). The pressure above and below the piston are recorded, along with the signal to the valve. The run length is 4 seconds (not critical) and the force gain $K_F$ is varied to give square waves with a period of 1.0 seconds (not critical) and peak-peak values of 2, 4, 8, and 16 volts to the valve (actually to the Bosch controller). This test can be repeated with the arm pinned at other positions.

Test 2 Closed Force Loop, Pinned Arm

Closed force loop driven by square waves in demanded force, with the rod pinned. The demanded force signal is generated from a square wave of demanded position, with the position lag set to unity and the position lead set to zero (to open the position loop). The maximum and minimum values of demanded force are +/−50 pounds and the period is 2 seconds.

The initial tuning values should be $K_F=2.0$ and the force lag should be set for a gain of unity. Then the pole and zero of the lag can be set based on the responses. Typical value are pole=−0.2 and zero=−1.6. This gives an alpha of 1.6/0.2=8 and the center frequency is sqrt(0.2*1.6)=0.57 rps. With proper values, there should be almost no overshoot in force. If the center frequency is too high (say 10 rps), the overshoot will increase substantially. Final tuning of the force loop should be done when both loops are active and the arm is running a typical profile.

Test 3 Open Position Loop, Closed Force Loop, Free Arm

In this test, the arm is free, the force loop is active, and the position loop is open. In order to keep the piston off the stops, the demanded force is switched between two constant values when the arm passes through preset values. Values that have been found satisfactory in the lab are +250 and −190 pounds for demanded force when the arm reaches limits of 4 volts and 6 volts on the position sensor. These values must be selected with some care in order to avoid excessive piston travels. The force loop should attempt to provide the constant demanded force, but will be unable to do so because of the rapidly changing volumes in the cylinder due to the motion of the Piston. Prolonged saturation of the valve signal should be avoided.

Test 4 Both Loops Closed, Demanded Pressure is Square Wave

With both the position and the force loops operational, a square-wave signal is used for the demanded position. The valve signal is likely to saturate, so it is necessary to restrict the demanded position signal to a small region around the kickback position. The valve signal hits its limits briefly.

Test 5 Both Loops Closed, Demanded Position Profile

This test is under the actual operating conditions that the control loops must meet and provides the best environment for final tuning of both loops.

The use of pressure measurements in conjunction with position measurement allows for a two loop controller consisting of a force controller that is driven by a position controller. This two loop configuration makes possible the elimination or significant reduction of a variety of undesirable effects associated with mechanical and pneumatic equipment. While the preferred embodiment is a takeout, this two loop configuration can also control other structures like an invert, etc. . . that are driven with pneumatic cylinders and must be positioned very accurately.

We claim:

1. A machine for forming glass containers from discrete gobs of molten glass comprising
   a mechanism displaceable between retracted and advanced positions, and
   means for displacing said mechanism including
      a pneumatic actuator having upper and lower chambers separated by a piston,
      a servo pneumatic valve controller for controlling said pneumatic actuator,
      means for calculating a position lead based upon the actual position of the mechanism,
      means for supplying a position demand,
      first means for differencing said position lead and position demand to define a position delta,
      means for calculating a position lag based on said position delta and converting said position lag to units of force,
      means for sensing the pressures within said upper and lower chambers and based thereon calculating a force signal representative of the force being applied to said piston,
      means for defining a feedforward force required to statically hold said mechanism at said demanded position,
      second means for summing said position lag units of force and said feedforward force and subtracting said force signal to define a force error,
      means for calculating the magnitude of a lag force based on said force error and
      means for driving said servo pneumatic valve controller with said lag force.

2. A machine according to claim 1, wherein said position lead, position lag and force lag are determined by the following equations:

$$PL(n) = C_0 * P(n) + C_1 * P(n-1) + D_1 \, PL(n-1)$$

$$PG(n) = A_0 * P_{delta}(n) + A_1 * P_{delta}(n-1) + B_1 \, PG(n-1)$$

$$FG(n) = E_0 * F_{error}(n) + E_1 \, F_{error}(n-1) + F_1 * FG(n-1)$$

where:

PL = Output of Position Lead
PG = Output of Position Lag
FG = Output of Force Lag
P = Present Position
$P_{delta}$ = Positional Difference
$F_{error}$ = Force Error
$A_0, A_1, B_1, C_0, C_1, D_1, E_0, E_1, +F_1$ = Empirically Derived Constants.

* * * * *